ABSTRACT

Sodium percarbonate is stabilized by a metal chelating agent which will produce a chelate compound insoluble or slightly soluble in water. Such metal chelating agent is dispersed in the reaction mixture with the aid of a surface active agent when sodium carbonate and hydrogen peroxide are reached and the crystals of sodium percarbonate are separated out.

9 Claims, No Drawings

PROCESS FOR PREPARING STABLE SODIUM PERCARBONATE

BACKGROUND OF THE INVENTION

1. FIELD OF THE INVENTION

This invention relates to a method of producing sodium percarbonate in the form of crystals or powder having a long shelf life or an excellent storage stability.

2. DESCRIPTION OF THE PRIOR ART

It is already known that inorganic peroxides which release active oxygen in an aqueous solution are used as a domestic or industrial bleaching agent or bleaching detergent composition. Among such inorganic peroxides, sodium perborate has a good stability during storage whether it is used as a bleaching agent or as an additive in a detergent composition as it does not substantially decompose during storage to lose available oxygen which is effective for the purpose of bleaching. However, it does not demonstrate its high bleaching effect unless it is used at a temperature over 60° C, so that this substance cannot show a sufficient bleaching effect in a country where laundering is generally performed at a low temperature.

On the other hand, sodium percarbonate has a higher solubility in water than sodium perborate and is also easily dissolved in cold water. Sodium percarbonate has the formula: $2Na_2CO_3 \cdot 3H_2O_2$. It is generally prepared by reacting 2 mols of sodium carbonate with 3 mols of hydrogen peroxide. However, if sodium percarbonate is mixed in a powdery detergent composition or bleaching agent composition, it is decomposed too rapidly under the atmospheric conditions where the temperature exceeds 30° C and the humidity is higher than 80% RH, so that no satisfactory bleaching effect can be obtained in a high-temperature high-humidity atmosphere. Various attempts have been made for improving the stability during storage of sodium percarbonate, and there have been proposed the following processes for stabilizing sodium percarbonate:

1. A method in which an inorganic salt known as a peroxide stabilizer, such as, for example, sodium silicate, magnesium silicate, magnesium oxide, sodium chloride or sodium sulfate, is added to sodium percarbonate.
2. A method in which an organic metal chelating agent of the water-soluble polyaminocarboxylic acid type, such as, for example, ethylenediaminetetraacetate, nitrilotriacetate or diethylenetriaminepentaacetate, is added to sodium percarbonate.
3. A method in which sodium percarbonate is granulated or coated with a water-soluble or water-insoluble or slightly water-soluble compound such as paraffin wax, polyethyleneglycol or alkanolamide.

These known methods, however, were not satisfactory, because they are insufficient with respect to their stabilizing effect on sodium percarbonate and a considerable decomposition of sodium percarbonate is caused during storage, or they are too complicated for practical use, or the water-solubility of sodium percarbonate is reduced remarkably in the process of coating the same.

SUMMARY OF THE INVENTION

The present invention has for its object to provide a method of producing sodium percarbonate having a better stability during storage than those obtained from the conventional stabilizing methods such as above-mentioned. The sodium percarbonate product obtained by the process of the present invention is stable both when it is stored by itself and when it is stored in the form of a mixture with detergents or decomposition promoting agents.

The object of the present invention is attained by a process for preparing stable sodium percarbonate by mixing sodium carbonate or an aqueous solution thereof and a hydrogen peroxide solution, characterized in that the crystals of sodium percarbonate are precipitated out in the presence of a chelating agent which will produce a water-insoluble or slightly water-soluble chelate compound with a heavy metal and a surface active agent. Such heavy metal will catalyze the decomposition of sodium percarbonate.

The chelating agents to be used in the method of the present invention include the following: oxine, salicylaldoxime, α-benzoinoxime, cupferon, aluminon, anthranilic acid, α-nitroso-β-naphthol, β-nitroso-α-naphthol, 2-methyloxine, 5-methyloxine, 6-methyloxine, 7-methyloxine, 8-hydroxy-2-phenylquinone, 1-hydroxyacyzine, 7-allyl-8-quinolinol, 7-allyl-5-nitroso-8-quinolinol, 5,7-dichlorooxine, 5,7-dibromooxine, quinaldic acid, quilinone-8-carboxylic acid, benzoylphenylhydroxylamine, salicylic acid, β-resorcinolic acid, P-aminosalicyclic acid, 5-nitrosalicylic acid, 3-bromosalicyclic acid, 5-bromo-1-resorcinolic acid, 1-hydroxy-2-naphthoic acid, 1-hydroxy-4-bromo-2-naphthoic acid, 1-nitroso-2-hydroxy-3-naphthoic acid and 2-hydroxy-1-naphthoaldehyde.

Generally, metal chelating agents are classified into the following two types: the chelating agents which will form water-soluble chelate compounds with metal ions and those which will form water-insoluble or slightly water-soluble chelate compounds with metal ions to separate out precipitates in water. The former type of chelating agents are usually called inhibitors or sequestering agents, and they include polyaminocarboxylic acids such as nitrilotriacetate and ethylenediaminetetraacetate. These inhibitors have been conventionally used as decomposition retarders for the peroxides, and the above-mentioned prior art method (2) utilizes this property. However, these agents are not satisfactory in their effect of retarding decomposition of sodium percarbonate, and particularly when sodium percarbonate is mixed in a detergent composition, their decomposition retarding effect is further lowered.

On the other hand, the latter type of chelating agents, which are used in the method of the present invention, are considered because they may be able to show an excellent decomposition retarding effect, which could never be obtained from the conventional methods, by having such chelating agents coexist with the starting materials in the production of sodium percarbonate. However, such chelating agents are mostly insoluble or slightly soluble in water, so that it was extremely difficult to have them coexist uniformly in the aqueous solution of sodium carbonate or hydrogen peroxide solution in the preparation of sodium percarbonate. Thus, these chelating agents, if added alone, cannot exhibit a satisfactory decomposition prevention effect.

According to the present invention, a surface active agent is added to disperse such water-insoluble or slightly soluble chelating agent in water so that such chelating agent will coexist uniformly in the aqueous sodium carbonate solution or hydrogen peroxide solution. Such surface active agent is also adsorbed or deposited on the produced sodium percarbonate to increase the efficiency of the chelating agent to improve its stabilizing effect.

The surface active agents to be used in the present invention may be anionic or nonionic surface active agents. Examples of the anionic surface active agents to be used in the present invention are: higher fatty acid salts, higher alcohol sulfates, alkylsulfonates, alkyldisulfonates, sulfonated oils and sulfonated fatty acid salts, sulfates of polyoxyethylenealkylethers, sulfates of alkylolamides of higher fatty acids, salts of sulfoalkyl compounds of higher fatty acids, alkylbenzenesulfonates, alkylphenolsulfonates, alkylnaphthalenesulfonates, and alkyldiphenylsulfonates. In the above compounds, the carbon numbers of alkyls, higher fatty acids and higher fatty alcohols are 8–18 and the cations are usually sodium or ammonium.

The nonionic surface active agents to be used in the present invention include the following: ethylene oxide addition products of higher fatty acids, ethylene oxide addition products of higher alcohols, ethylene oxide addition products of higher alkylamines, ethylene oxide addition products of higher fatty acid amines, ethylene oxide addition products of higher alkylmercaptanes, ethylene oxide addition products of alkylphenols, glycerinesters of higher fatty acids, glycolesters of higher fatty acids, pentaerythritolesters of higher fatty acids, sorbitanesters of higher fatty acids, or ethylene oxide addition products of sorbitanesters of higher fatty acids. Also, in these compounds, the carbon number of alkyls, higher fatty acids and higher alcohols are 8–18.

In the method of the present invention, the chelating agent and the surface active agent may be added either in an aqueous solution of sodium carbonate or in a hydrogen peroxide solution, and also the order of mixing may be selected suitably. Thus, it is possible to obtain similar stable sodium percarbonate either by adding a sodium carbonate solution containing a chelating agent and a surface active agent, to a hydrogen peroxide solution or by adding a hydrogen peroxide solution to said sodium carbonate solution, or by adding a hydrogen peroxide solution containing a chelating agent and a surface active agent to an aqueous solution of sodium carbonate, or by adding a sodium carbonate solution to said hydrogen peroxide solution. Also, solid sodium carbonate may be added to a hydrogen peroxide solution containing a chelating agent and a surface active agent.

In case an anionic surface active agent is used, the sodium percarbonate produced according to the method of the present invention does not form lumps or cakes when the produced sodium percarbonate is separated from the mother liquor and is dried, and even if it may form lumps, such lumps are extremely brittle and can be easily crushed into powders. Also, even if it is stored for a long time, it will be substantially free of caking and will maintain an excellent fluidity.

In the process for preparing sodium percarbonate according to the method of the present invention, the chelating agent is added generally in an amount of 0.001 to 10 weight%, preferably 0.005 to 1.0 wt.% based on the total amount of the aqueous solutions containing sodium carbonate and an equivalent amount of hydrogen peroxide. On the other hand, the surface active agent may be used in any suitable amount if it provides a sufficient concentration to make the chelating agent soluble or dispersable in the aqueous solution, but a too high concentration is undesirable in view of its solubility in water. Therefore, it is usually used in a concentration of less than 5 weight%, preferably in an amount of 0.001 to 0.5 wt.% based on the total amount of the aqueous solutions containing sodium carbonate and an equivalent amount of hydrogen peroxide.

Now the present invention is described in further detail by way of some preferred embodiments thereof in order to clarify the excellent effects of the invention.

EXAMPLE 1

Preparation of sodium percarbonate 0.1 Gram of oxine and 1 gr of sodium dodecylbenzenesulfonate were dissolved in 5 ml of ethanol, and the mixture was poured into 500 ml of water and well agitated. Then 210 gr of sodium carbonate was added and dissolved in the mixture, followed by the further addition of 340 gr of 30% aqueous hydrogen peroxide solution to react with the mixture. The solution was then cooled to 0° to 5° C and the produced crystals of sodium percarbonate were filtered out. These crystals were then dried either under a reduced pressure of 20 mmHg at about 30° C or naturally in air to obtain powdery sodium percarbonate. There were also prepared sodium percarbonate powder products in the same way as described above except there were used various other kinds of chelating agents and surface active agents as shown in Table 1.

Storage stability test

The thus prepared samples of sodium percarbonate were left in an atmosphere of 40° C temperature and 80% relative humidity for 20 days, and then the remaining available oxygen concentration of each sample was measured. The ratio of the remaining available oxygen concentration to the initial available oxygen concentration was expressed by percentage as remaining activity. For the sake of comparison, the remaining activity was determined with respect to the sodium percarbonate product which was prepared in the same way without adding any chelating agent and with respect to the sodium percarbonate product prepared similarly without using any surface active agent. The results are shown in Table 1.

Table 1

| Sample No. | Surface active agent | Concentration (%) | Chelating agent | Concentration (%) | Remaining activity (%) Chelating agent added | Remaining activity (%) No chelating agent added |
|---|---|---|---|---|---|---|
| 1 | None | 0 | Oxine | 0.01 | 32 | 10 |
| 2 | Sodium dodecylbenzenesulfonate | 0.1 | " | 0.01 | 78 | 14 |
| 3 | " | 0.2 | " | 0.2 | 85 | 13 |
| 4 | Sodium dodecylsulfate | 0.1 | " | 0.01 | 80 | 15 |
| 5 | Sodium oleate | 0.2 | " | 0.2 | 65 | 12 |
| 6 | Polyoxyethylenedodecylether | 0.05 | " | 0.01 | 60 | 18 |
| 7 | " | 0.05 | α-nitroso-β-naphthol | 0.1 | 56 | 18 |
| 8 | Polyethyleneglycolmonolaurate | 0.05 | Oxine | 0.01 | 52 | 20 |
| 9 | Sodium dodecylbenzenesulfonate | 0.1 | α-benzoinoxime | 0.1 | 40 | 14 |
| 10 | " | 0.1 | Salicylaldoxime | 0.05 | 75 | 14 |
| 11 | Sodium dodecyl- | 0.1 | Cupferon | 0.1 | 42 | 13 |

Table 1-continued

| Sample No. | Surface active agent | Concentration (%) | Chelating agent | Concentration (%) | Remaining activity (%) Chelating agent added | No chelating agent added |
|---|---|---|---|---|---|---|
| 12 | sulfate " | 0.1 | α-benzoinoxime | 0.1 | 48 | 13 |

As is apparent from the results shown in the above Table 1, sodium percarbonate prepared by adding a chelating agent which produces a water-insoluble or slightly water-soluble chelate compound and a surface active agent according to the method of the present invention has a better storage stability than those prepared without adding such chelating agent and/or surface active agent.

EXAMPLE 2

Sodium percarbonate prepared by adding a chelating agent and a surface active agent according to the process of Example 1 was blended in a detergent (A) having the following composition at a ratio of 15 parts by weight of sodium percarbonate to 85 parts by weight of the detergent composition (A) to prepare a powdery bleaching detergent, and this was left standing in an atmosphere of 40° C temperature and 80% relative humidity for 6 days, and then the remaining available oxygen concentration of sodium percarbonate was measured by a conventional method.

Composition of detergent (A):

|  | weight% |
|---|---|
| Sodium alkylbenzenesulfonate | 20.0 |
| Sodium tripolyphosphate | 20.0 |
| Sodium silicate | 5.0 |
| Sodium carbonate | 1.0 |
| Carboxymethylcellulose | 1.0 |
| Fluorescent dye, perfume | 0.7 |
| Sodium sulfate | 42.3 |
| Water | 10.0 |

The results are shown in Table 2. The remaining activity of sodium percarbonate is expressed by the ratio of the available oxygen concentration measured immediately after blending to the remaining available oxygen concentration after 6 days, expressed as a percentage.

Table 2

| Sample No. | Surface active agent | Concentration (%) | Chelating agent | Concentration (%) | Remaining activity % Chelating agent added | No chelating agent added |
|---|---|---|---|---|---|---|
| 1 | None | 0 | Oxine | 0.01 | 15 | 2 |
| 2 | Sodium dodecylbenzenesulfonate | 0.1 | " | 0.1 | 82 | 1 |
| 3 | " | 0.2 | " | 0.2 | 85 | 1 |
| 4 | Sodium dodecylsulfate | 0.1 | " | 0.01 | 79 | 2 |
| 5 | Sodium oleate | 0.2 | " | 0.2 | 75 | 2 |
| 6 | Polyoxyethylene-dodecylether | 0.05 | " | 0.01 | 33 | 5 |
| 7 | " | 0.05 | α-nitroso--62-naphthol | 0.1 | 28 | 5 |
| 8 | Polyethylene-glycol-monolaurate | 0.05 | Oxine | 0.01 | 24 | 4 |
| 9 | Sodium dodecyl-benzenesulfonate | 0.1 | α-benzoinoxime | 0.1 | 28 | 1 |
| 10 | " | 0.1 | Salicylaldoxime | 0.05 | 77 | 1 |
| 11 | Sodium dodecylsulfate | 0.1 | Cupferon | 0.1 | 52 | 2 |
| 12 | " | 0.1 | α-benzoinoxime | 0.1 | 36 | 2 |

It is known from the above-shown results that the bleaching detergent compositions, incorporated with the sodium percarbonate product prepared from a system containing a chelating agent which will produce a water-insoluble or slightly water-soluble chelate compound and a surface active agent, have a storage stability better than that of the detergent compositions containing no chelating agent, and that, even when the same chelating agent is used, sodium percarbonate prepared according to the method of the present invention shows a better storage stability than that added with no surface active agent and is well comparable in its storage stability to sodium perborate which is a stable bleaching agent.

The embodiments of the invention in which an exclusive property or privilege is claimed are defined as follows:

1. In a process for preparing stable sodium percarbonate which comprises mixing sodium carbonate or an aqueous solution thereof, with an aqueous solution of hydrogen peroxide, to effect a reaction therebetween to form sodium percarbonate and recovering the produced crystals of sodium percarbonate from the reaction mixture, the improvement which comprises; one of said aqueous solutions contains dissolved or dispersed therein, prior to said mixing, from 0.001 to 10 weight percent of a chelating agent selected from the group consisting of oxine, salicylaldoxime, α-benzoinoxime, cupferon, aluminon, anthranilic acid, α-nitroso-β-naphthol, β-nitroso-α-naphthol, 2-methyloxine, 5-methyloxine, 6-methyloxine, 7-methyloxine, 8-hydroxy-2-phenylquinone, 1-hydroxyacyzine, 7-allyl-8-quinolinol, 7-allyl-5-nitroso-8-quinolinol, 5,7-dichlorooxine, 5,7-dibromooxine, quinaldic acid, quilinone-8-carboxylic acid, benzoylphenylhydroxylamine, salicylic acid, β-resorcinolic acid, p-aminosalicyclic acid, 5-nitrosalicylic acid, 3-bromosalicylic acid, 5-bromo-1-resorcinolic acid, 1-hydroxy-2-naphthoic acid, 1-hydroxy-4-bromo-2-naphthoic acid, 1-nitroso-2-hydroxy-3-naphthoic acid and 2-hydroxy-1-naphthoaldehyde, and from 0.001 to 0.5 weight percent of an anionic surface active agent selected from the group consisting of higher fatty acid salts, higher alcohol sulfates, alkylsulfonates, alkyldisulfonates, sulfonated oils and sulfonated fatty acid salts, sulfates of polyoxyethylenealkylethers, sulfates of alkylolamides of higher fatty acids, salts of sulfoalkyl compounds of higher fatty acids, alkylbenzenesulfonates, alkylphenolsulfonates, alkylnaphthalenesulfonates, and alkyldiphenylsulfonates wherein the number of carbon atoms in the alkyl, fatty acid and fatty alcohol moieties are from 8 to 18, or a nonionic surface active agent selected from the group consisting of ethylene oxide addition products of higher fatty acids, ethylene oxide addition products of higher alcohols, ethylene oxide addition products of higher alkylamines, ethylene oxide addition products of higher fatty acid amines, ethylene oxide addition products of higher alkylmercaptans, ethylene oxide addition products of alkylphenols, glycerin esters of higher fatty acids, glycol esters of higher fatty acids, pentaerythritol esters of higher fatty acids, sorbitan esters of higher fatty acids, and ethylene oxide addition products of sorbitan esters of higher fatty acids wherein the number of carbon atoms in the alkyl, fatty acid and alcohol moieties are from 8 to 18, wherein both percentage ranges are based on the total weight of an aqueous solution containing said sodium carbonate and an equivalent amount of hydrogen peroxide.

2. A process as claimed in claim 1, wherein said chelating agent is added in an amount of 0.005 to 1.0% by weight based on the total amount of the aqueous solutions containing sodium carbonate and an equivalent amount of hydrogen peroxide.

3. A process as claimed in claim 1 in which said chelating agent is oxine.

4. A process as claimed in claim 1 in which said chelating agent is $\alpha$-nitroso-$\beta$-naphthol.

5. A process as claimed in claim 1 in which said chelating agent is $\alpha$-benzoinoxime.

6. A process as claimed in claim 1 in which said chelating agent is salicylaldoxime.

7. A process as claimed in claim 1 in which said chelating agent is cupferon.

8. A process as claimed in claim 3 in which said anionic surface active agent is sodium dodecylbenzene sulfonate.

9. A process as claimed in claim 3 in which said anionic surface active agent is sodium dodecyl sulfate.

* * * * *